(12) United States Patent
Kadoma et al.

(10) Patent No.: US 12,218,305 B2
(45) Date of Patent: *Feb. 4, 2025

(54) GRAPHENE COMPOUND, METHOD FOR FORMING GRAPHENE COMPOUND, AND LITHIUM-ION STORAGE BATTERY

(71) Applicant: SEMICONDUCTOR ENERGY LABORATORY CO., LTD., Atsugi (JP)

(72) Inventors: Hiroshi Kadoma, Kanagawa (JP); Teppei Oguni, Kanagawa (JP); Satoshi Seo, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 923 days.

This patent is subject to a terminal disclaimer.

(21) Appl. No.: 17/334,514

(22) Filed: May 28, 2021

(65) Prior Publication Data

US 2021/0296701 A1    Sep. 23, 2021

Related U.S. Application Data

(63) Continuation of application No. 16/544,958, filed on Aug. 20, 2019, now Pat. No. 11,024,878, which is a
(Continued)

(30) Foreign Application Priority Data

Mar. 2, 2016    (JP) ................................. 2016-040093

(51) Int. Cl.
*H01M 10/0565* (2010.01)
*C01B 32/194* (2017.01)
(Continued)

(52) U.S. Cl.
CPC ....... *H01M 10/0565* (2013.01); *C01B 32/194* (2017.08); *C01B 32/198* (2017.08);
(Continued)

(58) Field of Classification Search
CPC ......... H01M 10/0565; H01M 10/0525; H01M 10/0585; H01M 2300/0082; C01B 32/194;
(Continued)

(56) References Cited

U.S. PATENT DOCUMENTS 8,492,034 B2    7/2013    Takeshi et al.
9,725,603 B2    8/2017    Virtanen
(Continued)

FOREIGN PATENT DOCUMENTS

CN    102881940 A    1/2013
CN    104099050 A    10/2014
(Continued)

OTHER PUBLICATIONS

Matsuo.Y et al., "Preparation and characterization of silylated graphite oxide", Carbon, Jul. 25, 2005, vol. 43, No. 14, pp. 2875-2882.
(Continued)

*Primary Examiner* — Matthew E. Hoban
*Assistant Examiner* — Lynne Edmondson
(74) *Attorney, Agent, or Firm* — NIXON PEABODY LLP; Jeffrey L. Costellia

(57) ABSTRACT

A material that can be used in a wide temperature range is provided. A graphene compound includes graphene or graphene oxide and a substituted or unsubstituted chain group, the chain group includes two or more ether bonds, and the chain group is bonded to the above graphene or graphene oxide through a Si atom. Alternatively, a method for forming a graphene compound includes a first step and a second step
(Continued)

after the first step. In the first step, graphene oxide and a base are stirred under a nitrogen stream. In the second step, the mixture is cooled to room temperature, a silylating agent that has a group having two or more ether bonds is introduced into the mixture, and the obtained mixture is stirred. The base is butylamine, pentylamine, hexylamine, diethylamine, dipropylamine, dibutylamine, triethylamine, tripropylamine, or pyridine.

6 Claims, 4 Drawing Sheets

Related U.S. Application Data continuation of application No. 15/445,433, filed on Feb. 28, 2017, now Pat. No. 10,396,397.

(51) Int. Cl.
| | |
|---|---|
| *C01B 32/198* | (2017.01) |
| *C01B 32/23* | (2017.01) |
| *H01M 10/0525* | (2010.01) |
| *H01M 10/0585* | (2010.01) |
| *H01M 50/119* | (2021.01) |
| *H01M 50/121* | (2021.01) |
| *H01M 50/129* | (2021.01) |

(52) U.S. Cl.
CPC ......... *C01B 32/23* (2017.08); *H01M 10/0525* (2013.01); *H01M 10/0585* (2013.01); *H01M 50/119* (2021.01); *H01M 50/121* (2021.01); *H01M 50/129* (2021.01); *C01B 2204/22* (2013.01); *H01M 2300/0082* (2013.01); *Y02E 60/10* (2013.01); *Y02P 70/50* (2015.11); *Y02T 10/70* (2013.01)

(58) Field of Classification Search
CPC ... C01B 32/198; C01B 32/23; C01B 2204/22; Y02E 60/10; Y02P 70/50; Y02T 10/70
See application file for complete search history.

(56) References Cited

U.S. PATENT DOCUMENTS

| | | | |
|---|---|---|---|
| 10,396,397 B2 | 8/2019 | Kadoma et al. | |
| 10,529,980 B2 * | 1/2020 | Kadoma | H01M 4/1393 |
| 2003/0044681 A1 | 3/2003 | Morioka et al. | |
| 2011/0315934 A1 | 12/2011 | Ma et al. | |
| 2015/0014577 A1 | 1/2015 | Chowdhury et al. | |
| 2016/0240278 A1 | 8/2016 | Lee et al. | |
| 2016/0329533 A1 | 11/2016 | Tajima | |
| 2016/0349905 A1 | 12/2016 | Momma et al. | |
| 2016/0380271 A1 | 12/2016 | Ochiai et al. | |
| 2017/0005364 A1 | 1/2017 | Yamazaki et al. | |
| 2018/0019462 A1 | 1/2018 | Kadoma et al. | |
| 2018/0076489 A1 | 3/2018 | Mikami et al. | |

FOREIGN PATENT DOCUMENTS

| | | |
|---|---|---|
| CN | 105113043 A | 12/2015 |
| JP | 05-314965 A | 11/1993 |
| JP | 05-314995 A | 11/1993 |
| JP | 2001-319692 A | 11/2001 |
| JP | 2009-187783 A | 8/2009 |
| JP | 2010-049819 A | 3/2010 |
| JP | 2015-529610 | 10/2015 |
| WO | WO-2013/191809 | 12/2013 |
| WO | WO-2015/074752 | 5/2015 |
| WO | WO-2016/005665 | 1/2016 |
| WO | WO-2016/008187 | 1/2016 |
| WO | WO-2016/196936 | 12/2016 |

OTHER PUBLICATIONS

Ye.Y et al., "High performance composite polymer electrolytes using polymeric ionic liquid-functionalized graphene molecular brushes", J. Mater. Chem. A(Journal of Materials Chemistry A), 2015, vol. 3, No. 35, pp. 18064-18073, The Royal Society of Chemistry.

International Search Report (Application No. PCT/IB2017/050940) Dated May 16, 2017.

Written Opinion (Application No. PCT/IB2017/050940) Dated May 16, 2017.

Zhang.M et al., "Hyperbranched polysiloxane functionalization of graphene oxide for improved mechanical properties of cyanate ester nanocomposites", Journal of Composite Materials, Mar. 19, 2014, vol. 49, No. 8, pp. 939-948.

Wan.Y et al., "Mechanical properties of epoxy composites filled with silane-functionalized graphene oxide", Compozites, May 9, 2014, vol. Parts A 64, pp. 79-89.

* cited by examiner

GRAPHENE COMPOUND, METHOD FOR FORMING GRAPHENE COMPOUND, AND LITHIUM-ION STORAGE BATTERY

TECHNICAL FIELD

One embodiment of the present invention relates to a graphene compound.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

BACKGROUND ART

In recent years, a variety of power storage devices, for example, storage batteries such as lithium-ion storage batteries, lithium-ion capacitors, and air cells have been actively developed. In particular, demand for lithium-ion storage batteries with high output and high energy density has rapidly grown with the development of the semiconductor industry, for electronic devices, for example, portable information terminals such as mobile phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion storage batteries are essential as rechargeable energy supply sources for today's information society.

However, general lithium-ion storage batteries each have high energy density and each include an organic solvent which may catch fire at high temperatures as an electrolyte solution; thus, the lithium-ion storage batteries may generate heat, catch fire, or explode if a protection circuit which controls charge and discharge causes malfunction or a cell is damaged, for example. Such accidents are often reported.

An all-solid-state battery including not an electrolyte solution but a solid electrolyte has been researched as a battery that is less likely to cause such accidents. For example, a storage battery in which a polymer electrolyte having lithium ion conductivity is used as a solid electrolyte has been researched.

However, even in a lithium-ion storage battery including a polymer electrolyte, the battery characteristics might be significantly degraded when the temperature of the battery becomes low and the ionic conductivity is significantly decreased. For example, although polyethylene oxide (PEO) is known as a polymer that can be used for a lithium-ion storage battery (see Patent Documents 1 to 3), the lithium-ion storage battery used at low temperatures may cause a problem of a decrease in the ionic conductivity. The melting point of PEO is approximately 60° C., and PEO is dangerous when melted because a short circuit might be caused between electrodes; thus, PEO can be used only in a narrow temperature range in the first place.

REFERENCES

Patent Documents

[Patent Document 1] Japanese Published Patent Application No. 2001-319692
[Patent Document 2] Japanese Published Patent Application No. H05-314995
[Patent Document 3] Japanese Published Patent Application No. H05-314965

DISCLOSURE OF INVENTION

A solid electrolyte in an all-solid-state battery should have basic properties of high conductivity of ions that transfer electric charges and low conductivity of electrons in order to prevent a short circuit between a positive electrode and a negative electrode.

Since a storage battery is used under various environments, a solid electrolyte capable of exhibiting the above-described basic properties even at high temperatures is needed in order to obtain a practical all-solid-state lithium-ion storage battery. That is, a solid electrolyte capable of withstanding high temperatures is needed. For example, a material having excellent heat resistance as well as the properties of a solid electrolyte such as polyethylene oxide (PEO) is needed.

In recent years, deformable electronic devices have been actively developed. In order to obtain such flexible electronic devices, components of the electronic devices also need to be deformable. Not only housings and displays but also storage batteries included in the electronic devices need to be flexible.

In order to obtain a flexible solid storage battery, components of the solid storage battery also need to be flexible; thus, a solid electrolyte also needs to be flexible. A ceramic solid electrolyte is widely researched in addition to a polymer-based solid electrolyte such as PEO. Although the ceramic solid electrolyte tends to have higher ionic conductivity than the polymer-based solid electrolyte, the ceramic solid electrolyte is easily broken or is likely to be apart from an active material when being bent; thus, the ceramic solid electrolyte is not very suitable for the flexible solid storage battery.

In view of the above, an object of one embodiment of the present invention is to provide a material used for a solid electrolyte of a solid storage battery. Another object is to provide a material that can be used in a wide temperature range. Another object is to provide a material that can withstand deformation. Another object is to provide a chemically modified graphene compound. Another object is to provide a novel graphene compound.

Another object of one embodiment of the present invention is to provide a storage battery that can be changed in shape, i.e., a flexible storage battery. Another object is to provide a novel storage battery having flexibility and including a novel graphene compound.

Note that the descriptions of these objects do not disturb the existence of other objects. In one embodiment of the present invention, there is no need to achieve all the objects. Other objects will be apparent from and can be derived from the description of the specification, the drawings, the claims, and the like.

In view of the above, one embodiment of the present invention is a graphene compound having graphene or graphene oxide and a substituted or unsubstituted chain group. The chain group has two or more ether bonds. The chain group is bonded to the above graphene or graphene oxide through a Si atom. Another embodiment of the present invention is a graphene compound having graphene or graphene oxide and a substituted or unsubstituted chain group. The chain group has four or more ether bonds. The chain group is bonded to the above graphene or graphene oxide through a Si atom. Another embodiment of the present invention is a graphene compound having graphene or graphene oxide and a substituted or unsubstituted chain group. The chain group has 2 to 20 ether bonds. The chain group is bonded to the above graphene or graphene oxide through a Si atom.

Another embodiment of the present invention is a graphene compound having a structure represented by the following formula (200).

[Chemical Formula 1]

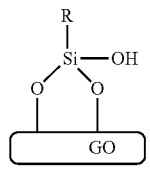

(200)

Note that in the formula (200), GO represents graphene or graphene oxide, and R represents a substituted or unsubstituted chain group having at least two ether bonds.

Another embodiment of the present invention is a graphene compound having a structure represented by the following formula (201).

[Chemical Formula 2]

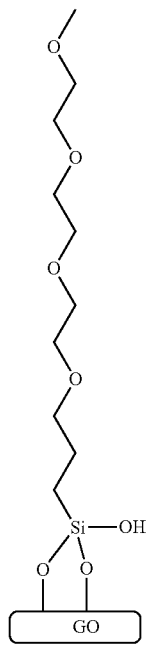

(201)

Note that in the formula (201), GO represents graphene or grapheme oxide.

Another embodiment of the present invention is a graphene compound having a structure represented by the following formula (202).

[Chemical Formula 3]

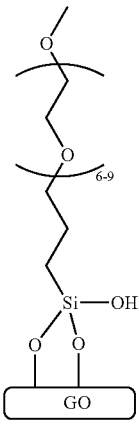

(202)

Note that in the formula (202), GO represents graphene or grapheme oxide.

Another embodiment of the present invention is a lithium-ion storage battery including any of the above-described graphene compounds, an exterior body, a positive electrode current collector, and a negative electrode current collector.

Another embodiment of the present invention is a method for forming a graphene compound including a first step and a second step after the first step. In the first step, graphene oxide and a base are stirred under a nitrogen stream. In the second step, the mixture is cooled to room temperature, a silylating agent that has a group having two or more ether bonds is introduced into the mixture, and the obtained mixture is stirred. The base is butylamine, pentylamine, hexylamine, diethylamine, dipropylamine, dibutylamine, triethylamine, tripropylamine, or pyridine.

Another embodiment of the present invention is a method for forming a graphene compound including a first step and a second step after the first step. In the first step, graphene oxide and butylamine are stirred under a nitrogen stream. In the second step, the mixture is cooled to room temperature, methoxytriethyleneoxypropyltrichlorosilane is dripped into the mixture, and the obtained mixture is stirred.

Another embodiment of the present invention is a method for forming a graphene compound including a first step and a second step after the first step. In the first step, graphene oxide and butylamine are stirred under a nitrogen stream. In the second step, the mixture is cooled to room temperature, 2-[methoxy(polyethyleneoxy)6-9propyl]trichlorosilane is dripped into the mixture, and the obtained mixture is stirred.

According to one embodiment of the present invention, a material used for a solid electrolyte of a solid storage battery is provided. According to one embodiment of the present invention, a material that can be used in a wide temperature range is provided. According to one embodiment of the present invention, a material that can withstand deformation is provided. According to one embodiment of the present invention, a chemically modified graphene compound is provided. According to one embodiment of the present invention, a novel graphene compound is provided.

According to one embodiment of the present invention, a storage battery that can be changed in shape, i.e., a flexible storage battery is provided. According to one embodiment of the present invention, a novel storage battery having flexibility and including a novel graphene compound is provided.

Note that the description of these effects does not preclude the existence of other effects. One embodiment of the present invention does not necessarily achieve all the effects listed above. Other effects will be apparent from and can be derived from the description of the specification, the drawings, the claims, and the like.

BEST MODE FOR CARRYING OUT THE INVENTION

Figure 1A:
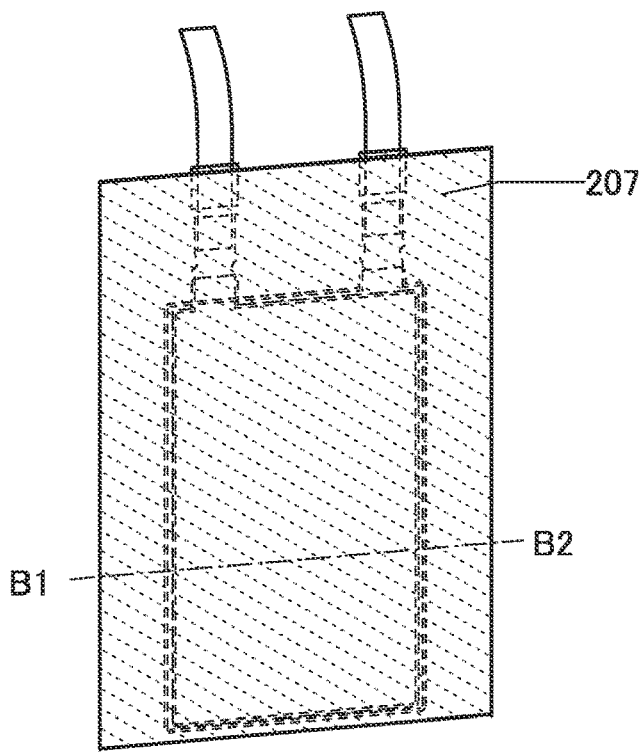
FIGS. 1A and 1B illustrate a lithium-ion storage battery.

Hereinafter, embodiments of the present invention will be described in detail with reference to the accompanying drawings. Note that the present invention is not limited to the description below, and it is easily understood by those skilled in the art that modes and details of the present invention can be modified in various ways. Furthermore, the present invention should not be construed as being limited to the description of the embodiments.

Note that in drawings described in this specification, the sizes, thicknesses, and the like of components such as a positive electrode, a negative electrode, an active material layer, a separator, and an exterior body are exaggerated for simplicity in some cases. Therefore, the sizes of the components are not limited to the sizes in the drawings and relative sizes between the components.

Note that the ordinal numbers such as "first", "second", and "third" in this specification and the like are used for convenience and do not denote the order of steps, the positional relation, or the like. Therefore, for example, description can be made even when "first" is replaced with "second" or "third", as appropriate. In addition, the ordinal numbers in this specification and the like are not necessarily the same as those which specify one embodiment of the present invention.

Note that in the structures of the present invention described in this specification and the like, the same portions or portions having similar functions in different drawings are denoted by the same reference numerals, and descriptions thereof are not repeated. Furthermore, the same hatching pattern is applied to portions having similar functions, and the portions are not especially denoted by reference numerals in some cases.

In this specification, flexibility refers to a property of an object being flexible and bendable. In other words, it is a property of an object that can be deformed in response to an external force applied to the object, and elasticity or restorability to the former shape is not taken into consideration. A flexible object can be deformed in response to an external force. A flexible object can be used with its shape fixed in a state of being deformed, can be used while repeatedly deformed, and can be used in a state of not deformed.

In this specification, modification may refer to changing of a function or a property of a graphene compound by chemically changing the graphene compound. It may refer to addition of a functional group having a certain function or property.

The descriptions in embodiments for the present invention can be combined with each other as appropriate.

Embodiment 1

In this embodiment, a graphene compound formed according to one embodiment of the present invention is described. In addition, a method for forming a graphene compound by chemical modification is described. The graphene compound formed according to one embodiment of the present invention has a function of conducting metal ions such as lithium, sodium, magnesium, and calcium and thus can be used for a solid electrolyte of a lithium-ion storage battery, for example. However, one embodiment of the present invention is not limited thereto.

<Graphene Compound>

First, graphene and a graphene compound are described.

Graphene is a one-atom-thick sheet of carbon atoms arranged in a hexagonal lattice structure on a plane. Bonds between carbon atoms in graphene are stronger than those in diamond; thus, graphene has extremely high resistance to deformation and pulling. However, graphene has extremely high conductivity and is not sufficiently permeable to lithium ions; thus, graphene by itself is not suitable for a solid electrolyte of a lithium-ion storage battery.

In general, graphene has various kinds of defects in some cases. For example, a carbon atom forming a lattice may be missing or a five-membered ring or a seven-membered ring may exist in a lattice in addition to a six-membered ring, and a carbon atom is bonded to an atom other than a carbon atom in some cases. Such a defect site can be utilized to bond graphene with an atom or an atomic group to obtain a desired property. Here, a graphene compound of one embodiment of the present invention is described.

Graphene has carbon atoms arranged in one atomic layer. A π bond exists between the carbon atoms. Graphene including two or more and one hundred or less layers is referred to as multilayer graphene in some cases. The length in the longitudinal direction or the length of the major axis in a plane in each of graphene and multilayer graphene is greater than or equal to 50 nm and less than or equal to 100 μm or greater than or equal to 800 nm and less than or equal to 50 μm.

In this specification and the like, a compound including graphene or multilayer graphene as a basic skeleton is referred to as a graphene compound. Graphene compounds include graphene and multilayer graphene.

Graphene compounds are detailed below.

A graphene compound is, for example, a compound where graphene or multilayer graphene is modified with an atom other than carbon or an atomic group with an atom other than a carbon atom. An atomic group that modifies graphene or multilayer graphene is referred to as a substituent, a functional group, a characteristic group, or the like in some cases. Modification in this specification and the like refers to introduction of an atomic group with an atom other than a carbon atom or an atomic group composed mainly of a carbon atom to graphene, multilayer graphene, a graphene compound, or graphene oxide (described later) by a substitution reaction, an addition reaction, or other reactions.

Note that the front surface and the back surface of graphene may be modified with different atoms or different atomic groups. In multilayer graphene, multiple layers may be modified with different atoms or atomic groups.

An example of the above-described graphene modified with an atom or an atomic group is graphene or multilayer graphene that is modified with oxygen or a functional group containing oxygen. A graphene compound modified with oxygen or a functional group containing oxygen is referred to as graphene oxide in some cases. In this specification, graphene oxides include multilayer graphene oxides.

The modification not only means introduction of one kind of atom or atomic group but also means introduction of two or more kinds of atoms or atomic groups by two or more types of chemical reaction. The modification includes an addition reaction of hydrogen, a halogen atom, a hydrocarbon group, an aromatic hydrocarbon group, or a heterocyclic compound group. Examples of a reaction of introducing an atomic group to graphene include an addition reaction and a substitution reaction. Alternatively, a Friedel-Crafts reaction, a Bingel reaction, or the like may be performed. A radical addition reaction may be performed on graphene, and a ring may be formed between graphene and an atomic group by a cycloaddition reaction.

A formation method example of graphene oxide is described below. Graphene oxide can be obtained by oxidizing the aforementioned graphene or multilayer graphene. Alternatively, graphene oxide can be obtained by being separated from graphite oxide. Graphite oxide can be obtained by oxidizing graphite. The graphene oxide may be further modified with the above-mentioned atom or atomic group.

A compound that can be obtained by reducing graphene oxide is referred to as reduced graphene oxide (RGO) in some cases. In RGO, in some cases, all oxygen atoms contained in the graphene oxide are not extracted and part of them remains in a state of oxygen or an atomic group containing oxygen that is bonded to carbon.

A graphene compound may have a sheet-like shape where a plurality of graphene compounds overlap with each other. Such a graphene compound is referred to as a graphene compound sheet in some cases. The graphene compound sheet has, for example, an area with a thickness larger than or equal to 0.33 nm and smaller than or equal to 10 mm, preferably larger than or equal to 0.34 nm and smaller than or equal to 10 µm. The graphene compound sheet may be modified with an atom other than carbon, an atomic group containing an atom other than carbon, an atomic group composed mainly of carbon such as an alkyl group, or the like. A plurality of layers in the graphene compound sheet may be modified with different atoms or atomic groups.

A graphene compound may have a five-membered ring composed of carbon atoms or a poly-membered ring that is a seven- or more-membered ring composed of carbon atoms, in addition to a six-membered ring composed of carbon atoms. In the neighborhood of a poly-membered ring which is a seven- or more-membered ring, a region through which a lithium ion can pass may be generated.

A plurality of graphene compounds may be gathered to form a sheet-like shape.

A graphene compound has a planar shape, thereby enabling surface contact.

<Chemically Modified Graphene Compound>

Next, a chemically modified graphene compound is described. A graphene compound formed by a formation method of one embodiment of the present invention can be used for a solid electrolyte of a lithium-ion storage battery, for example. In that case, the graphene compound needs to have an insulating property to prevent a short circuit between a positive electrode and a negative electrode. Note that the graphene compound according to one embodiment of the present invention has conductivity to metal ions such as sodium, magnesium, and calcium in addition to lithium; thus, the graphene compound according to one embodiment of the present invention can be used for applications other than a lithium-ion storage battery. In this embodiment, a storage battery including a lithium ion, which is a typical example of such metal ions, as a carrier is described; the description can also be used for a storage battery including another metal ion as a carrier.

Pure graphene is known to have high conductivity, and pure graphene by itself cannot be used for a solid electrolyte of a lithium-ion storage battery. Although graphene oxide has relatively low conductivity, it has low reduction resistance and thus is easily reduced to RGO having high conductivity. In order to provide graphene oxide or graphene with an insulating property stably, chemical modification is preferably used. For example, graphene oxide or graphene may be chemically modified with a molecule having an alkyl chain that has a relatively large number of carbon atoms. When both surfaces of a sheet-like graphene oxide are modified with a compound having a long chain alkyl group, the distance between a plurality of sheets of graphene oxide is increased and electronic conduction is suppressed because the alkyl chain contains a functional group having low electrical conductivity, so that an insulating property can be provided.

However, an alkyl group is a non-polar functional group and has a low affinity for lithium ions which cause a battery reaction in a lithium-ion storage battery. Thus, when graphene is chemically modified with a compound having a long chain alkyl group, the transfer of lithium ions is inhibited and accordingly a battery reaction is inhibited. In addition, a lithium salt is not easily dissociated. Accordingly, a lithium-ion storage battery including a graphene compound modified with a compound having a long chain alkyl group as a solid electrolyte has poor characteristics.

In view of the above, the graphene compound of one embodiment of the present invention has both an insulating property and an affinity for lithium ions. For example, it is preferable that the graphene compound be chemically modified to have a chain functional group having an ether bond. The ether bond has a polarity and a group having the ether bond is classified into a hydrophilic group. In addition, a group having the ether bond has an affinity for lithium ions owing to a polarity of the ether bond and contributes to the transfer of lithium ions. Furthermore, when the graphene compound is used for a solid electrolyte of a lithium-ion storage battery, the number of ether bonds in a functional group of the graphene compound is preferably large because the mobility of lithium ions is improved.

The graphene compound of one embodiment of the present invention has, when used for a solid electrolyte, higher heat resistance than a polymer electrolyte. High heat resistance is especially important for a lithium-ion storage battery because when its component is damaged and an unexpected reaction occurs, a serious accident such as firing or explosion might occur. Low heat resistance of its component is a major problem when a lithium-ion storage battery is used in a severe environment, e.g., in a car. The graphene compound of one embodiment of the present invention can withstand such an environment because of its high heat resistance. Thus, the graphene compound of one embodiment of the present invention is suitably used for a solid electrolyte of a lithium-ion storage battery.

Here, a formula showing a general example of the chemically modified graphene compound of one embodiment of the present invention is shown below.

[Chemical Formula 4]

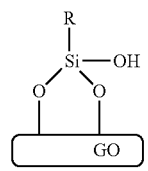

(200)

In a formula (200), R represents a substituted or unsubstituted chain group having at least two ether bonds. Note that R may have a branched structure. Furthermore, GO represents graphene or graphene oxide. There is no particular limitation on the molecular weight or molecular structure of graphene in the graphene compound of one embodiment of the present invention, and graphene in any size can be used. Accordingly, it is impossible to specify a molecular structure of the graphene compound of one embodiment of the present invention in detail and fully represent the molecular structure of the graphene compound of one embodiment of the present invention. Thus, the chemically modified graphene compound of one embodiment of the present invention might be practically specified by describing a formation method; for example, a graphene compound chemically modified with a silylating agent that has a substituted or unsubstituted group having at least two ether bonds. In addition, it is impossible or impractical to specify the chemically modified graphene compound of one embodiment of the present invention without describing a formation method, in some cases. Furthermore, although GO and Si are fixed in the shape of a GO layer with two Si—O bonds in the above formula, the number of the Si—O bonds may be one or three. The bond is not limited to the Si—O bond, and another bond may be used.

<Chemical Modification>

Next, a method for chemically modifying a graphene compound is described using the following synthesis scheme (A-1).

[Chemical Formula 5]

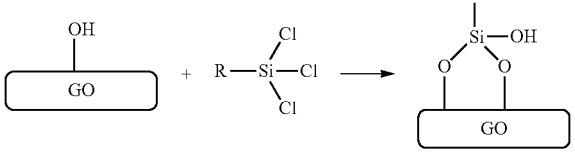

(A-1)

As shown in the synthesis scheme (A-1), graphene oxide (GO) is chemically modified with a silylating agent that has a chain group having two or more ether bonds, whereby an objective compound can be obtained. In the synthesis scheme (A-1), R represents a substituted or unsubstituted chain group having at least two ether bonds, and R may have a branched structure.

Examples of a base that can be used in the synthesis scheme (A-1) include, but are not limited to, organic bases such as butylamine, pentylamine, hexylamine, diethylamine, dipropylamine, dibutylamine, triethylamine, tripropylamine, and pyridine.

Examples of a solvent that can be used in the synthesis scheme (A-1) include, but are not limited to, aromatic hydrocarbons such as toluene, xylene, and mesitylene; hydrocarbons such as hexane and heptane; and ether such as ethylene glycol dimethyl ether. It is particularly preferable to use primary amine as a base and an aromatic hydrocarbon as a solvent.

Instead of the silylating agent shown in the synthesis scheme (A-1), an agent having a trialkoxysilyl group may be used. However, the present invention is not limited thereto.

Specific Example

Here, examples of the silylating agent that has a chain group having two or more ether bonds are shown below. With the use of any of such silylating agents, a graphene compound chemically modified with a chain group having ether bonds can be formed.

[Chemical Formulae 6]

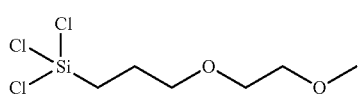

(100)

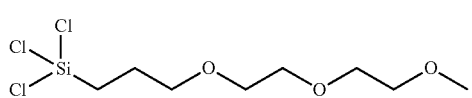

(101)

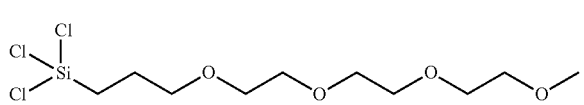

(102)

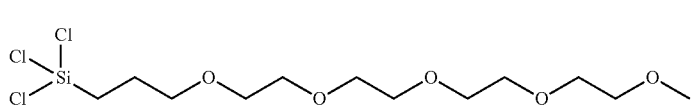

(103)

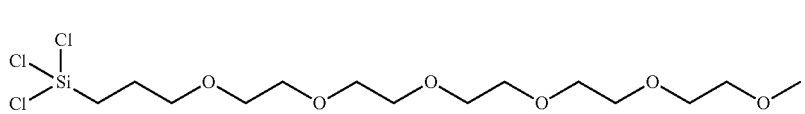

(104)

-continued
(105)
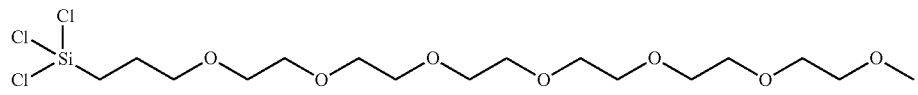
(106)
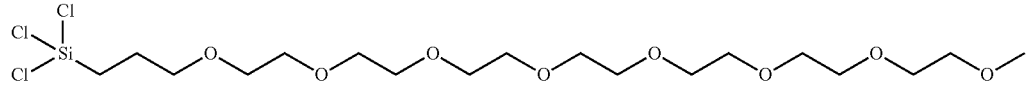
(107)
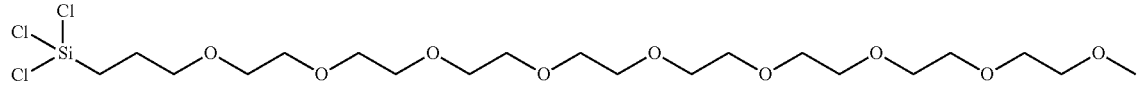
(108)
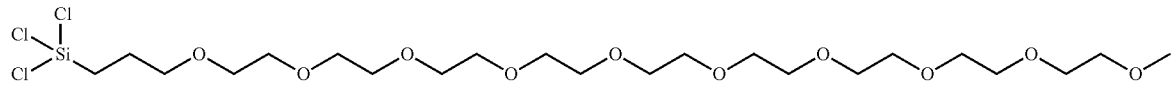
[Chemical Formulae 7]
(109)
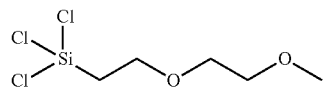
(110)
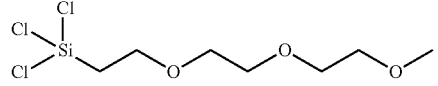
(111)
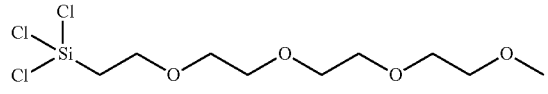
(112)
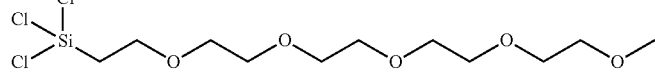
(113)
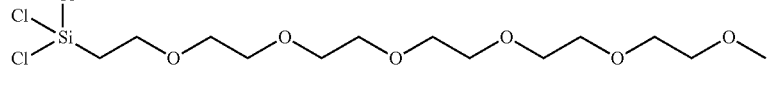
(114)
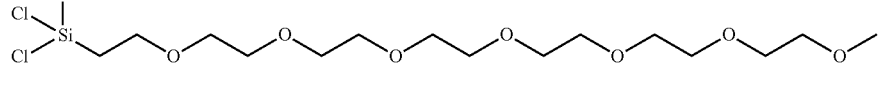
(115)
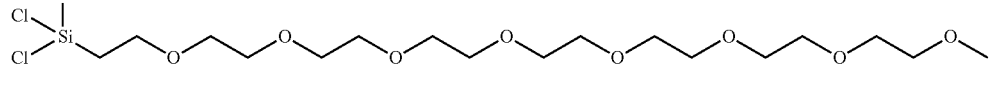
(116)
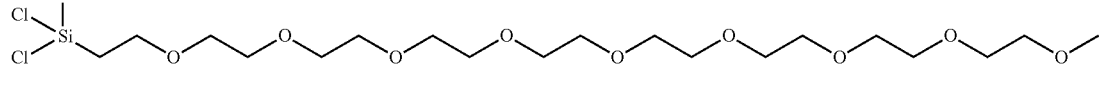
(117)
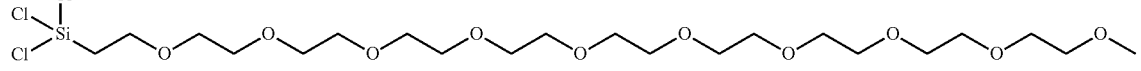

[Chemical Formulae 8]
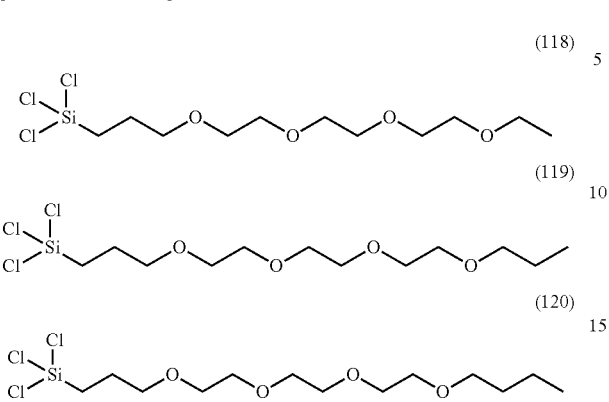
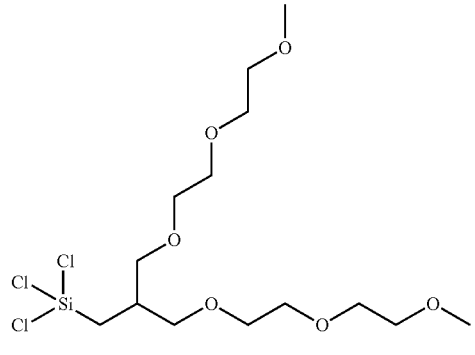
[Chemical Formulae 9]
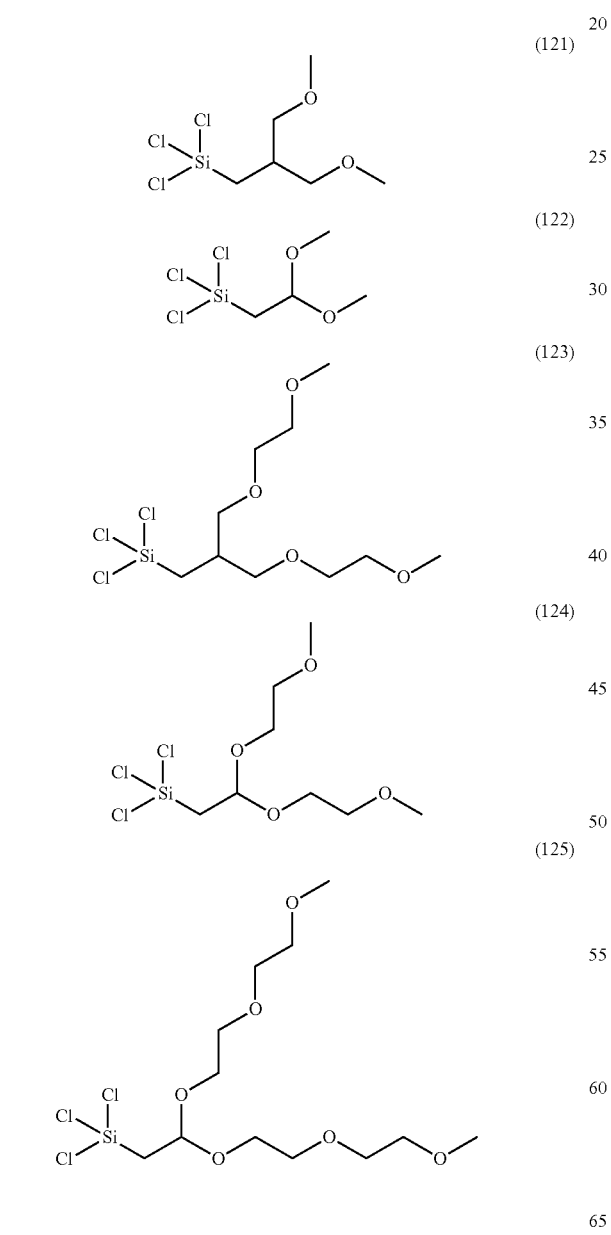
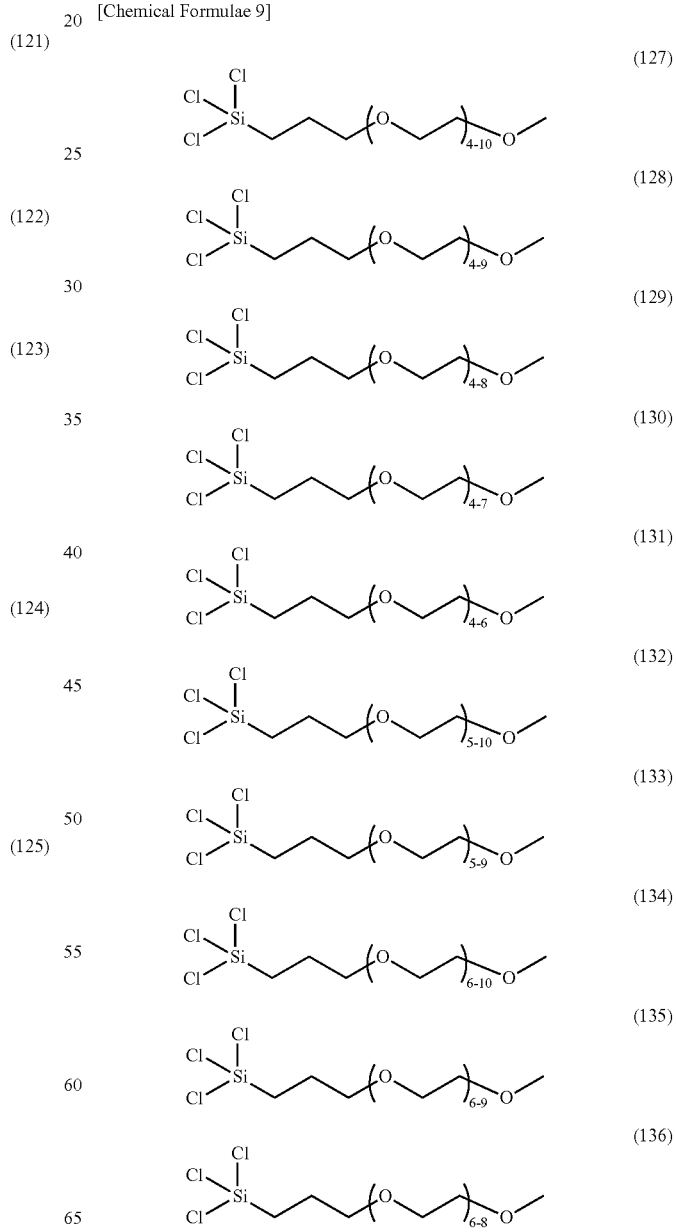

[Chemical Formulae 10]

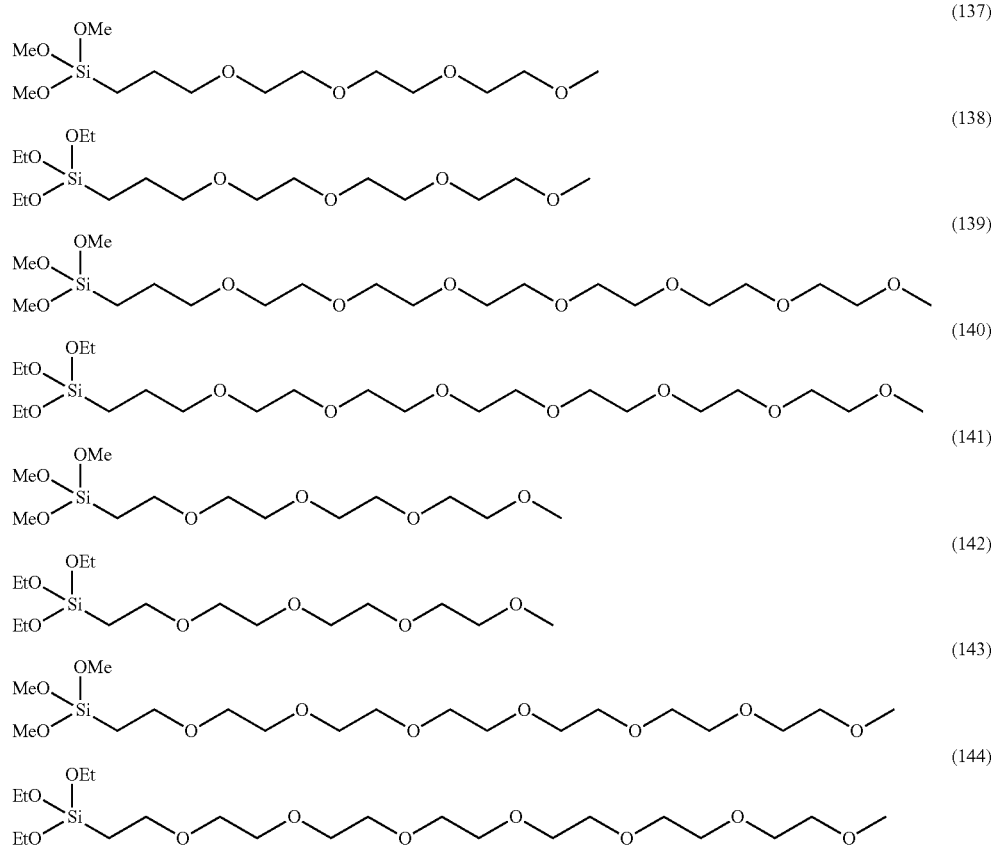

[Chemical Formulae 11]

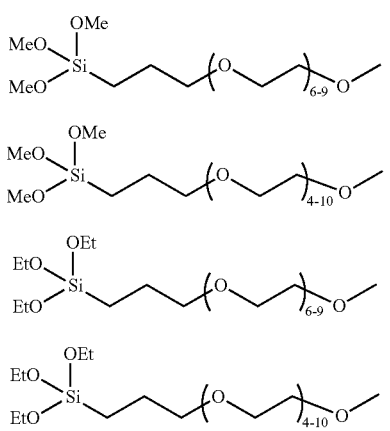

In formulae (137) to (148), OMe represents a methoxy group and OEt represents an ethoxy group. With the use of any of the above silylating agents, the graphene compound that has a chain group having at least two ether bonds can be formed. The graphene compound chemically modified with any of these silylating agents has low electron conductivity and high lithium ion conductivity and thus is suitably used for a solid electrolyte or a separator of a lithium-ion storage battery. Note that the graphene compound of one embodiment of the present invention may be formed without using any of the above-described silylating agents.

In Embodiment 1, one embodiment of the present invention has been described. Other embodiments of the present invention are described in Embodiment 2. Note that one embodiment of the present invention is not limited thereto. For example, although an example of the graphene compound that has a chain group having at least two ether bonds is described as one embodiment of the present invention, one embodiment of the present invention is not limited to this example. Depending on circumstances or conditions, one embodiment of the present invention is not necessarily the graphene compound that has a chain group having at least two ether bonds. For example, depending on circumstances or conditions, the graphene compound of one embodiment of the present invention does not necessarily have a chain structure having at least two ether bonds.

This embodiment can be combined with Embodiment 2 as appropriate.

Embodiment 2

In this embodiment, a structure of a lithium-ion storage battery including the graphene compound of one embodiment of the present invention is described.

A method for forming a lithium-ion storage battery 110 of one embodiment of the present invention is described below with reference to FIGS. 1A and 1B. FIG. 1B is a cross-sectional view of the lithium-ion storage battery 110. In the schematic cross-sectional view, a positive electrode current collector 100, a positive electrode active material layer 101, a solid electrolyte layer 104, a negative electrode active material layer 103, and a negative electrode current collector 102 are stacked and enclosed by an exterior body 207. Note that the active material layers can be formed on both surfaces of the current collector, and the storage battery can have a stacked-layer structure.

<<Structure of Positive Electrode>>

A positive electrode is described. The positive electrode includes the positive electrode active material layer 101 and the positive electrode current collector 100.

As the positive electrode active material used for the positive electrode active material layer 101, a material into and from which carrier ions such as lithium ions can be inserted and extracted can be used. Examples of the material include a lithium-containing material with an olivine crystal structure, a layered rock-salt crystal structure, and a spinel crystal structure. Alternatively, a polyanionic positive electrode material can be used, for example. Examples of the polyanionic positive electrode material include a material with an olivine crystal structure and a material with a NASICON structure.

As the positive electrode active material, various composite oxides can be used. For example, a compound such as $LiFeO_2$, $LiCoO_2$, $LiNiO_2$, $LiMn_2O_4$, $V_2O_5$, $Cr_2O_5$, or $MnO_2$ can be used.

As the material with a layered rock-salt crystal structure, a composite oxide represented by $LiMO_2$ can be used, for example. The element M is preferably one or more elements selected from Co and Ni. Note that $LiCoO_2$ is preferable because it has high capacity, stability in the air, and thermal stability, for example. As the element M, one or more elements selected from Al and Mn may be contained in addition to one or more elements selected from Co and Ni. For example, $LiCo_xMn_yNi_zO_w$ (x, y, and z are each ⅓ or a neighborhood thereof and w is 2 or a neighborhood thereof, for example) can be used.

The term "neighborhood" means, for example, a value 0.9 to 1.1 times a certain value.

As the positive electrode active material, for example, a solid solution obtained by combining two or more composite oxides can be used. For example, a solid solution of $LiCo_{1/3}Mn_{1/3}Ni_{1/3}O_2$ and $Li_2MnO_3$ can be used as the positive electrode active material.

As the material with a spinel crystal structure, a composite oxide represented by $LiM_2O_4$ can be used, for example. As the element M, Mn is preferably contained. For example, $LiMn_2O_4$ can be used. It is preferable that Ni be contained as the element M in addition to Mn because the discharge voltage and the energy density of the storage battery are improved in some cases. It is preferable to add a small amount of lithium nickel oxide ($LiNiO_2$ or $LiNi_{(1-x)}M_xO_2$ (M=Co, Al, or the like)) to a lithium-containing material with a spinel crystal structure which contains manganese such as $LiMn_2O_4$ because characteristics of the storage battery can be improved.

The average diameter of primary particles of the positive electrode active material is preferably greater than or equal to 5 nm and less than or equal to 100 μm, further preferably greater than or equal to 50 nm and less than or equal to 50 μm, and still further preferably greater than or equal to 100 nm and less than or equal to 500 nm, for example. Furthermore, the specific surface area is preferably greater than or equal to 5 $m^2/g$ and less than or equal to 15 $m^2/g$. Furthermore, the average diameter of secondary particles is preferably greater than or equal to 5 μm and less than or equal to 50 μm. Note that the average particle diameter can be measured with a particle size distribution analyzer or the like using a laser diffraction and scattering method or by observation with a scanning electron microscope (SEM) or a TEM. The specific surface area can be measured by a gas adsorption method.

A conductive material such as a carbon layer may be provided on the surface of the positive electrode active material. With the conductive material such as the carbon layer, conductivity of the electrode can be increased. For example, the positive electrode active material can be coated with the carbon layer by mixing a carbohydrate such as glucose at the time of baking the positive electrode active material.

A polyanionic positive electrode material containing oxygen, an element X, a metal A, and a metal M can be used, for example. The metal M is one or more of Fe, Mn, Co, Ni, Ti, V, and Nb; the metal A is one or more of Li, Na, and Mg; and the element X is one or more of S, P, Mo, W, As, and Si.

Alternatively, a composite material $LiMPO_4$ (general formula, where M is one or more of Fe(II), Mn(II), Co(II), and Ni(II)) can be used. Typical examples of the general formula $LiMPO_4$ include lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

$LiFePO_4$ is particularly preferable because it properly has properties necessary for the positive electrode active material, such as safety, stability, high capacity density, and the existence of lithium ions which can be extracted in initial oxidation (charging).

Alternatively, a composite material such as $Li_{(2-j)}MSiO_4$ (general formula, where M is one or more of Fe(II), Mn(II), Co(II), and Ni(II); 0≤j≤2) may be used. Typical examples of the general formula $Li_{(2-j)}MSiO_4$ include lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Alternatively, a nasicon compound represented by a general formula $A_xM_2(XO_4)_3$ (A=Li, Na, or Mg, M=Fe, Mn, Ti, V, or Nb, X=S, P, Mo, W, As, or Si) can be used. Examples of the nasicon compound include $Fe_2(MnO_4)_3$, $Fe_2(SO_4)_3$, and $Li_3Fe_2(PO_4)_3$. Alternatively, a compound represented by a general formula $Li_2MPO_4F$, $Li_2MP_2O_7$, or $Li_5MO_4$ (M=Fe or Mn) can be used as the positive electrode active material.

Alternatively, a polyanionic positive electrode material containing V can be used. Typical examples thereof include α-$LiVOPO_4$, β-$LiVOPO_4$, α1-$LiVOPO_4$, $LiVPO_4F$, $LiVPO_4O$, $LiVP_2O_7$, $LiVOSO_4$, $Li_2VOSiO_4$, and $LiVMoO_6$.

Alternatively, a perovskite fluoride such as $NaFeF_3$ and $FeF_3$, a metal chalcogenide (a sulfide, a selenide, and a telluride) such as $TiS_2$ and $MoS_2$, an oxide with an inverse spinel crystal structure such as $LiMVO_4$, a vanadium oxide (e.g., $V_2O_5$, $V_6O_{13}$, and $LiV_3O_8$), a manganese oxide, an organic sulfur compound, or the like can be used as the positive electrode active material.

Alternatively, a borate-based positive electrode material represented by a general formula LiMBO$_3$ (M is Fe(II), Mn(II), or Co(II)) can be used as the positive electrode active material.

Another example of the positive electrode active material is a lithium-manganese composite oxide represented by a composition formula Li$_a$Mn$_b$M$_c$O$_d$. Here, the element M is preferably a metal element other than lithium and manganese, or silicon or phosphorus, further preferably nickel. Furthermore, in the case where the whole particle of a lithium-manganese composite oxide is measured, it is preferable to satisfy the following at the time of discharging: 0<a/(b+c)<2; c>0; and 0.26≤(b+c)/d<0.5. To achieve a high capacity, the lithium-manganese composite oxide preferably includes a region where the surface portion and the middle portion are different in the crystal structure, the crystal orientation, or the oxygen content. To obtain such a lithium-manganese composite oxide, it is preferable that 1.6≤a≤1.848, 0.19≤c/b≤0.935, and 2.5≤d≤3. Furthermore, it is particularly preferable to use a lithium-manganese composite oxide represented by a composition formula Li$_{1.68}$Mn$_{0.8062}$Ni$_{0.318}$O$_3$. In this specification and the like, a lithium-manganese composite oxide represented by a composition formula Li$_{1.68}$Mn$_{0.8062}$Ni$_{0.318}$O$_3$ refers to that formed at a ratio (molar ratio) of the amounts of raw materials of Li$_2$CO$_3$:MnCO$_3$:NiO=0.84:0.8062:0.318. Although this lithium-manganese composite oxide is represented by a composition formula Li$_{1.68}$Mn$_{0.8062}$Ni$_{0.318}$O$_3$, the composition might deviate from this.

Note that the ratios of metal, silicon, phosphorus, and other elements to the total composition in the whole particle of a lithium-manganese composite oxide can be measured with, for example, an inductively coupled plasma mass spectrometer (ICP-MS). The ratio of oxygen to the total composition in the whole particle of a lithium-manganese composite oxide can be measured by, for example, energy dispersive X-ray spectroscopy (EDX). Alternatively, the ratio of oxygen to the total composition in the whole particle of a lithium-manganese composite oxide can be measured by ICP-MS combined with fusion gas analysis and valence evaluation of X-ray absorption fine structure (XAFS) analysis. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

In the case where carrier ions are alkali metal ions other than lithium ions, or alkaline-earth metal ions, a material containing an alkali metal (e.g., sodium or potassium) or an alkaline-earth metal (e.g., calcium, strontium, barium, beryllium, or magnesium) instead of lithium may be used as the positive electrode active material. For example, the positive electrode active material may be a layered oxide containing sodium.

As the positive electrode active material, for example, an oxide containing sodium, such as NaFeO$_2$, Na$_{2/3}$[Fe$_{1/2}$Mn$_{1/2}$]O$_2$, Na$_{2/3}$[Ni$_{1/3}$Mn$_{2/3}$]O$_2$, Na$_2$Fe$_2$(SO$_4$)$_3$, Na$_3$V$_2$(PO$_4$)$_3$, Na$_2$FePO$_4$F, NaVPO$_4$F, NaMPO$_4$ (M is Fe(II), Mn(II), Co(II), or Ni(II)), Na$_2$FePO$_4$F, or Na$_4$Co$_3$(PO$_4$)$_2$P$_2$O$_7$ can be used.

Alternatively, a lithium-containing metal sulfide can be used as the positive electrode active material. Examples of the lithium-containing metal sulfide include Li$_2$TiS$_3$ and Li$_3$NbS$_4$.

The average particle diameter of primary particles of the positive electrode active material is greater than or equal to 50 nm and less than or equal to 100 μm.

The positive electrode active material and a negative electrode active material have a main role in battery reactions of the storage battery, and receive and release carrier ions. To increase the lifetime of the storage battery, a material that has a small amount of capacity relating to irreversible battery reactions and has high charge and discharge efficiency is preferably used for the active materials.

The active material is in contact with an electrolyte solution. When the active material reacts with the electrolyte solution, the active material is lost and deteriorates by the reaction, which decreases the capacity of the storage battery. Therefore, it is preferable that such a reaction not be caused in the storage battery so that the storage battery hardly deteriorates.

Examples of the conductive additive of the electrode include acetylene black (AB), graphite (black lead) particles, carbon nanotubes, graphene, and fullerene.

A network for electric conduction can be formed in the electrode by the conductive additive. The conductive additive also allows maintaining of a path for electric conduction between the positive electrode active material particles. The addition of the conductive additive to the positive electrode active material layer increases the electric conductivity of the positive electrode active material layer 101.

A typical example of the binder is polyvinylidene fluoride (PVDF), and other examples of the binder include polyimide, polytetrafluoroethylene, polyvinyl chloride, ethylene-propylene-diene polymer, fluorine rubber, polymethyl methacrylate, polyethylene, and nitrocellulose.

The content of the binder in the positive electrode active material layer 101 is preferably greater than or equal to 0.5 wt % and less than or equal to 10 wt %, further preferably greater than or equal to 2 wt % and less than or equal to 8 wt %, and still further preferably greater than or equal to 3 wt % and less than or equal to 5 wt %. The content of the conductive additive in the positive electrode active material layer 101 is preferably greater than or equal to 1 wt % and less than or equal to 10 wt %, further preferably greater than or equal to 1 wt % and less than or equal to 5 wt %.

In the case where the positive electrode active material layer 101 is formed by a coating method, the positive electrode active material, the binder, the conductive additive, and a dispersion medium are mixed to form an electrode slurry, and the electrode slurry is applied to the positive electrode current collector 100 and dried.

The positive electrode current collector 100 can be formed using a material which has high conductivity and is not alloyed with a carrier ion of lithium or the like, such as stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, and nickel. The positive electrode current collector can have a foil-like shape, a plate-like shape (sheet-like shape), a net-like shape, a punching-metal shape, an expanded-metal shape, or the like as appropriate.

Through the above steps, the positive electrode of the lithium-ion storage battery can be formed.

<<Structure of Negative Electrode>>

Next, the negative electrode is described. The negative electrode includes the negative electrode active material layer 103 and the negative electrode current collector 102. Steps of forming the negative electrode are described below.

Examples of a carbon-based material as the negative electrode active material used for the negative electrode active material layer 103 include graphite, graphitizing carbon (soft carbon), non-graphitizing carbon (hard carbon), a carbon nanotube, graphene, and carbon black. Examples of graphite include artificial graphite such as meso-carbon microbeads (MCMB), coke-based artificial graphite, or pitch-based artificial graphite and natural graphite such as spherical natural graphite. In addition, examples of the shape of graphite include a flaky shape and a spherical shape.

Other than the carbon-based material, a material that enables charge-discharge reactions by an alloying reaction and a dealloying reaction with lithium can be used for the negative electrode active material. For example, a material containing at least one of Ga, Si, Al, Ge, Sn, Pb, Sb, Bi, Ag, Zn, Cd, In, and the like can be used. Such elements have a higher capacity than carbon. In particular, silicon is preferably used because of its high theoretical capacity of 4200 mAh/g. Examples of the alloy-based material containing such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{(3-x)}M_xN$ (M is Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

When a nitride containing lithium and a transition metal is used, lithium is contained in the negative electrode active material and thus the negative electrode active material can be used in combination with a material for a positive electrode active material that does not contain lithium, such as $V_2O_5$ or $Cr_3O_8$. In the case of using a material containing lithium as a positive electrode active material, the nitride containing lithium and a transition metal can be used for the negative electrode active material by extracting lithium contained in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The particle diameter of the negative electrode active material is preferably greater than or equal to 50 nm and less than or equal to 100 µm, for example.

Note that a plurality of materials for active materials can be combined at a given proportion both for the positive electrode active material layer 101 and the negative electrode active material layer 103. The use of a plurality of materials for the active material layer makes it possible to select the property of the active material layer in more detail.

Examples of the conductive additive in the electrode include acetylene black (AB), graphite (black lead) particles, carbon nanotubes, graphene, and fullerene.

A network for electric conduction can be formed in the electrode by the conductive additive. The conductive additive also allows maintaining of a path for electric conduction between the negative electrode active material particles. The addition of the conductive additive to the negative electrode active material layer increases the electric conductivity of the negative electrode active material layer 103.

A typical example of the binder is polyvinylidene fluoride (PVDF), and other examples of the binder include polyimide, polyvinyl chloride, ethylene-propylene-diene polymer, styrene-butadiene rubber, acrylonitrile-butadiene rubber, fluorine rubber, polyvinyl acetate, polymethyl methacrylate, polyethylene, and nitrocellulose.

The content of the binder in the negative electrode active material layer 103 is preferably greater than or equal to 1 wt % and less than or equal to 10 wt %, further preferably greater than or equal to 2 wt % and less than or equal to 8 wt %, and still further preferably greater than or equal to 3 wt % and less than or equal to 5 wt %. The content of the conductive additive in the negative electrode active material layer 103 is preferably greater than or equal to 1 wt % and less than or equal to 10 wt %, further preferably greater than or equal to 1 wt % and less than or equal to 5 wt %.

Next, the negative electrode active material layer 103 is formed over the negative electrode current collector 102. In the case where the negative electrode active material layer 103 is formed by a coating method, the negative electrode active material, the binder, the conductive additive, and a dispersion medium are mixed to form a slurry, and the slurry is applied to the negative electrode current collector 102 and dried. If necessary, pressing may be performed after the drying.

The negative electrode current collector 102 can be formed using a material which has high conductivity and is not alloyed with a carrier ion of lithium or the like, such as stainless steel, gold, platinum, iron, copper, titanium, or tantalum, or an alloy thereof. Alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, and nickel. The negative electrode current collector 102 can have a foil-like shape, a plate-like shape (sheet-like shape), a net-like shape, a punching-metal shape, an expanded-metal shape, or the like as appropriate. The negative electrode current collector 102 preferably has a thickness greater than or equal to 5 µm and less than or equal to 30 µm. Part of the surface of the electrode current collector may be provided with an undercoat layer using graphite or the like.

Through the above steps, the negative electrode of the lithium-ion storage battery can be formed.

<<Solid Electrolyte Layer>>
<Li Salt Mixing>

In the case of using the graphene compound of one embodiment of the present invention for a solid electrolyte, the graphene compound is mixed with a Li salt.

For example, a solution obtained by dispersing the graphene compound of one embodiment of the present invention in tetrahydrofuran (THF) and a solution obtained by dispersing lithium bis(trifluoromethanesulfonyl)amide (LiTFSA) in THF are mixed. Next, one or several drops of the mixed solution are dripped into a material of a solid electrolyte layer, the material is partially dried using a hot plate, and then drying is performed at 90° C. under reduced pressure to form the solid electrolyte layer. The solid electrolyte layer is in a film form in some cases. The solid electrolyte layer 104 is provided between the positive electrode and the negative electrode, and the resulting component is stored in the exterior body.

Note that a method for mixing the Li salt with the graphene compound, which is employed in the case of using the graphene compound of one embodiment of the present invention for a solid electrolyte, is not limited thereto.

In addition to the solid electrolyte layer 104, a separator may be provided between the positive electrode and the negative electrode. The separator needs to have an insulating property of inhibiting the contact between the electrodes, a property of holding the electrolyte solution, and ionic conductivity.

The separator with a size large enough to cover each surface of either the positive electrode or the negative electrode, in a form of sheet or envelope, may be fabricated to form the electrode wrapped in the separator. In that case, the electrode can be protected from mechanical damages in the fabrication of the storage battery, which facilitates the handling of the electrode. The electrode wrapped in the separator and the other electrode are provided in the exterior body, whereby the storage battery can be fabricated.

Furthermore, for the separator, any of a fluorine-based polymer, polyethers such as a polyethylene oxide and a polypropylene oxide, polyolefins such as polyethylene and polypropylene, polyacrylonitrile, polyvinylidene chloride, polymethyl methacrylate, polymethyl acrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, nonwoven fabric, and glass fiber can be used either alone or in combination. By using both the solid electrolyte layer 104 and the separator, the properties of the separator of the storage battery can be selected more variously than in the case of using one of the solid electrolyte layer 104 and the separator.

Furthermore, the storage battery may be flexible. In the case where flow stress is applied to the flexible storage battery, the stress can be relieved by sliding of the solid electrolyte layer 104 and the separator at the interface therebetween. Therefore, the structure including the solid electrolyte layer 104 and the separator is also suitable as a structure of the separator in the flexible storage battery.

Through the above steps, the solid electrolyte layer 104 can be incorporated in the lithium-ion storage battery.

<<Structure of Exterior Body>>

Next, the exterior body 207 is described. As the exterior body 207, a film having a three-layer structure can be used; for example, a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film. With such a three-layer structure, permeation of the electrolyte solution and a gas can be blocked and an insulating property and resistance to the electrolyte solution can be obtained. The exterior body is folded inwardly with one portion overlapping with another portion thereof, or two exterior bodies are stacked with the inner surfaces facing each other, in which case application of heat melts the materials on the overlapping inner surfaces to cause fusion bonding between the two exterior bodies. In this manner, a sealing structure can be formed.

A portion where the sealing structure is formed by fusion bonding or the like of the exterior body is referred to as a sealing portion. In the case where the exterior body is folded inwardly, the sealing portion is formed in the place other than the fold, and a first region of the exterior body and a second region of the exterior body that overlaps with the first region are fusion-bonded, for example. In the case where two exterior bodies are stacked, the sealing portion is formed along the entire outer region by heat fusion bonding or the like.

<<Flexible Storage Battery>>

With use of a flexible material selected from materials of the members described in this embodiment, a flexible lithium-ion storage battery can be fabricated. Deformable devices are currently under active research and development. For such devices, flexible storage batteries are demanded.

Figure 2A:
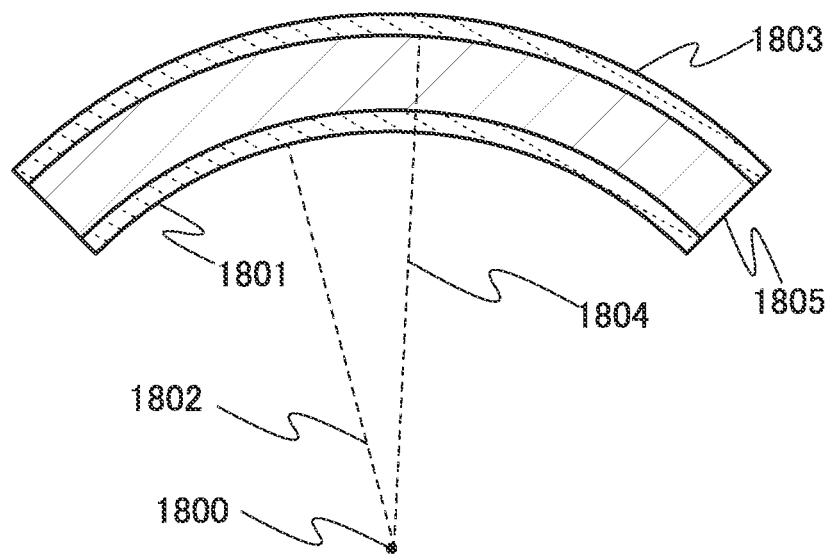
FIGS. 2A to 2D illustrate a flexible lithium-ion storage battery.
Figure 2B:
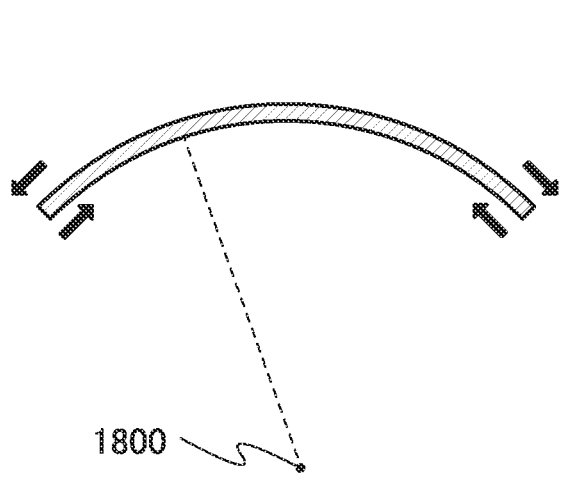

In the case of bending a storage battery in which a battery material 1805 including electrodes and a solid electrolyte is sandwiched between two films as exterior bodies, a radius 1802 of curvature of a film 1801 close to a center 1800 of curvature of the storage battery is smaller than a radius 1804 of curvature of a film 1803 far from the center 1800 of curvature (FIG. 2A). When the storage battery is curved and has an arc-shaped cross section, compressive stress is applied to a surface of the film on the side closer to the center 1800 of curvature and tensile stress is applied to a surface of the film on the side farther from the center 1800 of curvature (FIG. 2B).

When the flexible lithium-ion storage battery is deformed, a high stress is applied to the exterior bodies. However, even with the compressive stress and tensile stress due to the deformation of the storage battery, the influence of a strain can be reduced by forming a pattern including projections or depressions on surfaces of the exterior bodies. For this reason, the storage battery can change its shape such that the exterior body on the side closer to the center of curvature has a curvature radius greater than or equal to 50 mm, preferably greater than or equal to 30 mm.

Figure 3A:
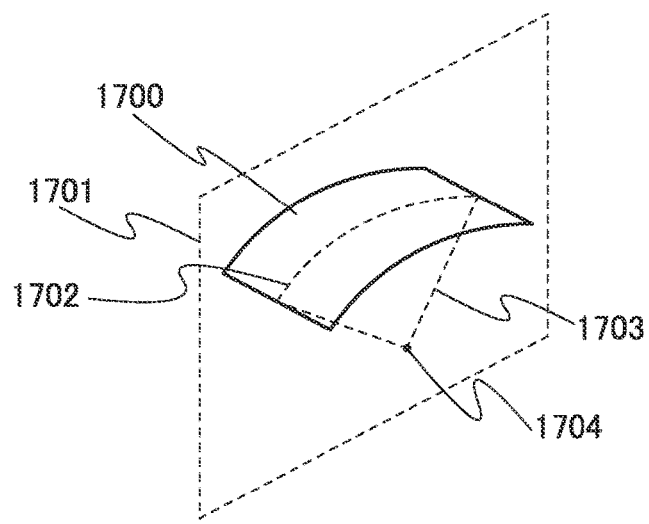
FIGS. 3A to 3C illustrate a flexible lithium-ion storage battery.
Figure 3B:
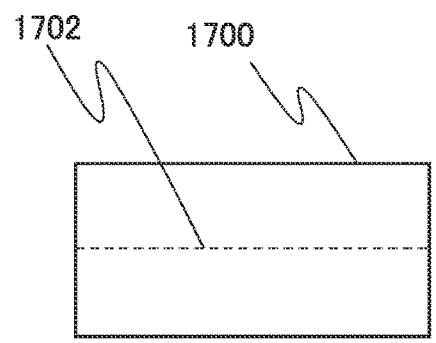
Figure 3C:
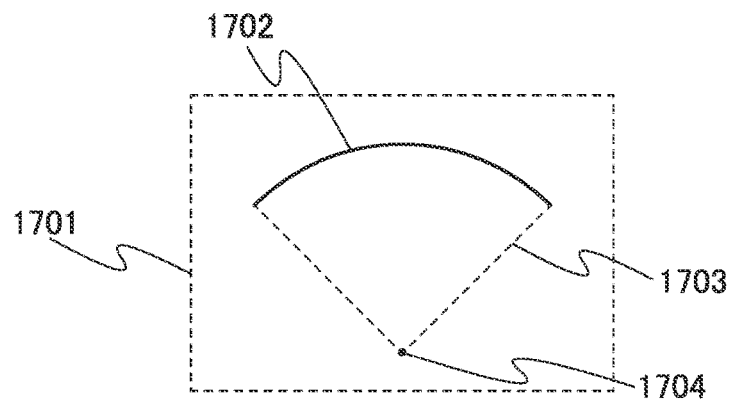

The radius of curvature of a surface is described with reference to FIGS. 3A to 3C. In FIG. 3A, on a plane 1701 along which a curved surface 1700 is cut, part of a curve 1702 forming the curved surface 1700 is approximate to an arc of a circle; the radius of the circle is referred to as a radius of curvature 1703 and the center of the circle is referred to as a center of curvature 1704. FIG. 3B is a top view of the curved surface 1700. FIG. 3C is a cross-sectional view of the curved surface 1700 taken along the plane 1701. When a curved surface is cut along a plane, the radius of curvature of a curve in a cross section differs depending on the angle between the curved surface and the plane or on the cut position, and the smallest radius of curvature is defined as the radius of curvature of a surface in this specification and the like.

Figure 2C:
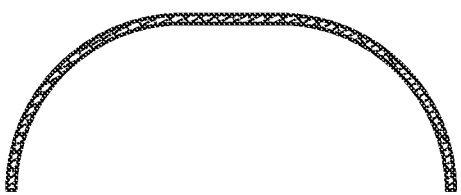
Figure 2D:
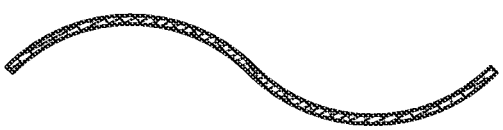

Note that the cross-sectional shape of the storage battery is not limited to a simple arc shape, and the cross section can be partly arc-shaped; for example, a shape illustrated in FIG. 2C, a wavy shape illustrated in FIG. 2D, or an S shape can be used. When the curved surface of the storage battery has a shape with a plurality of centers of curvature, the storage battery can change its shape such that a curved surface with the smallest radius of curvature among radii of curvature with respect to the plurality of centers of curvature, which is a surface of the exterior body on the side closer to the center of curvature, has a curvature radius greater than or equal to 50 mm, preferably greater than or equal to 30 mm.

<<Assembly of Storage Battery and Aging>>

Figure 1B:
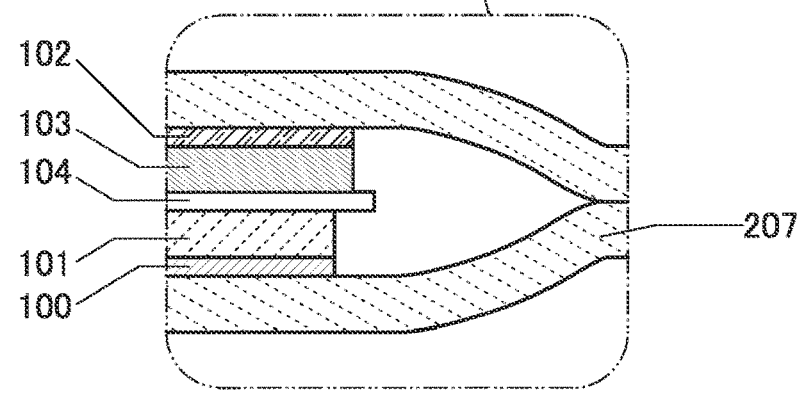

Next, the above components are combined and enclosed in the exterior body 207, so that the positive electrode current collector 100, the positive electrode active material layer 101, the solid electrolyte layer 104, the negative electrode active material layer 103, and the negative electrode current collector 102 are stacked and enclosed in the exterior body 207 as illustrated in FIGS. 1A and 1B.

Then, an aging step may be performed. First, environmental temperature is kept at about room temperature for example, and constant current charge is performed to a predetermined voltage at a low rate. Next, a gas generated in a region inside the exterior body by charging is released outside the exterior body, and then charge is performed at a rate higher than that of the initial charge.

After that, the storage battery is preserved at relatively high temperatures for a long time. For example, the storage battery is kept at higher than or equal to 40° C. for longer than or equal to 24 hours.

After the storage battery is preserved at relatively high temperatures for a long time, a gas generated in a region inside the exterior body is released again. Furthermore, the storage battery is discharged at a rate of 0.2 C at room temperature, charged at the same rate, discharged at the same rate again, and further charged at the same rate. Then, discharge is performed at the same rate, which terminates the aging step.

In the aforementioned manner, the storage battery of one embodiment of the present invention can be fabricated.

This embodiment can be combined with any of the other embodiments as appropriate.

Note that in the case where at least one specific example is described in a diagram or text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted. The embodiment of the invention is clear.

Note that in this specification and the like, a content described in at least a diagram (which may be part of the diagram) is disclosed as one embodiment of the invention, and one embodiment of the invention can be constituted. Therefore, when a certain content is described in a diagram, the content is disclosed as one embodiment of the invention even when the content is not described with text, and one embodiment of the invention can be constituted. In a similar manner, part of a diagram, which is taken out from the diagram, is disclosed as one embodiment of the invention, and one embodiment of the invention can be constituted. The embodiment of the invention is clear.

EXAMPLE

In this example, synthesis examples of the graphene compound of one embodiment of the present invention described in Embodiment 1 are described.

Synthesis Example 1

First, a synthesis example of graphene oxide having a structure represented by the following formula (201) is described.

[Chemical Formula 12]

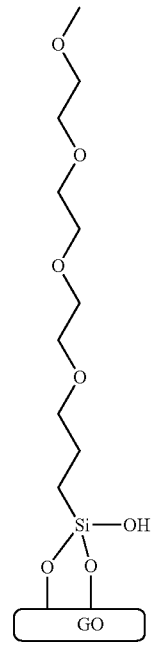

(201)

First, into a 50-mL two-neck flask were put 0.31 g of graphene oxide (Rap dGO (TQ-11)-1 produced by NiSiNa materials Co., Ltd.) and 4.2 g (58 mmol) of n-butylamine. This mixture was irradiated with ultrasonic waves for 5 minutes and stirred at 60° C. for 1 hour, under a nitrogen stream. After the stirring, this mixture was cooled to room temperature, 15 mL of toluene was added to this mixture, and the obtained mixture was irradiated with ultrasonic waves for 5 minutes. After this mixture was cooled to 0° C., 8.0 g (24 mmol) of methoxytriethyleneoxypropyltrichlorosilane (CAS registry number: 228700-87-6) was dripped thereinto, and the obtained mixture was stirred at 60° C. for 5 hours. After the stirring, this mixture was washed with toluene, and the resulting solid was collected by suction filtration. The obtained solid was washed with ethanol and acetone. The obtained solid was dried, whereby 0.39 g of target black powder was obtained. The synthesis scheme (A) is shown below.

[Chemical Formula 13]

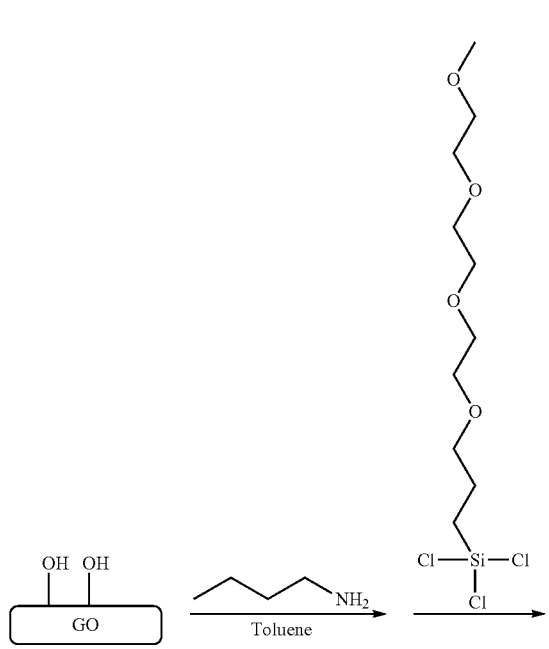

(A)

[Chemical Formula 14]

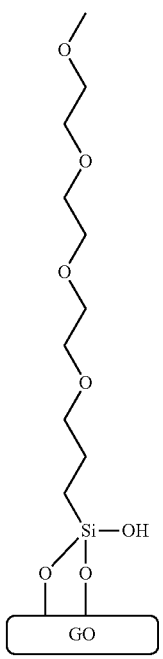

(202)

Into a 50-mL two-neck flask were put 0.30 g of graphene oxide (Rap dGO (TQ-11)-1 produced by NiSiNa materials Co., Ltd.) and 4.3 g (59 mmol) of n-butylamine. This mixture was irradiated with ultrasonic waves for 5 minutes and stirred at 60° C. for 1 hour, under a nitrogen stream. After the stirring, this mixture was cooled to room temperature, 15 mL of toluene was added to this mixture, and the obtained mixture was irradiated with ultrasonic waves for 5 minutes. After this mixture was cooled to 0° C., 14 g of 2-[methoxy(polyethyleneoxy)6-9propyl]trichlorosilane (CAS registry number: 36493-41-1) was dripped thereinto, and the obtained mixture was stirred at 60° C. for 5 hours. After the stirring, this mixture was washed with toluene, and the resulting solid was collected by suction filtration. The obtained solid was washed with ethanol and acetone. The obtained solid was dried, whereby 0.37 g of target black powder was obtained. The synthesis scheme (B) is shown below.

[Chemical Formula 15]

(B)

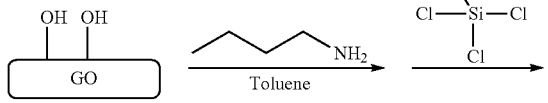

Synthesis Example 2

Next, another synthesis example of the graphene compound of one embodiment of the present invention described in Embodiment 1 is described. That is, a synthesis example of graphene oxide having a structure represented by the following formula (202) is described.

-continued

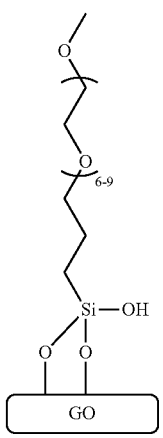

<FT-IR Analysis>

In the above-described synthesis example 1, Fourier transform infrared spectroscopy (FT-IR) analysis was performed in order to determine whether the graphene compound was chemically modified.

The FT-IR analysis was performed on the chemically modified graphene compound formed in the synthesis example 1 (sample 1), the chemically modified graphene compound formed in the synthesis example 2 (sample 2), and unmodified graphene oxide (comparative sample 1).

In the FT-IR analysis, attenuated total reflection (ATR) was performed using Nicolet NEXUS 670 produced by Thermo Fisher Scientific Inc. The sample 1 and the sample 2 were each in a film shape when the synthesis was completed; thus, an ATR prism was pressed onto each of the samples, and the samples were set in an analysis apparatus. Although the comparative sample 1 was powder, the ATR prism was pressed onto the comparative sample, and the comparative sample was set in the analysis apparatus.

The measurement range was from 700 cm$^{-1}$ to 4000 cm$^{-1}$, the resolution was 4.0 cm$^{-1}$, the number of times of scan was 256 (the number of times of background scan was 256), and the mirror speed was 0.6329.

Figure 4A:
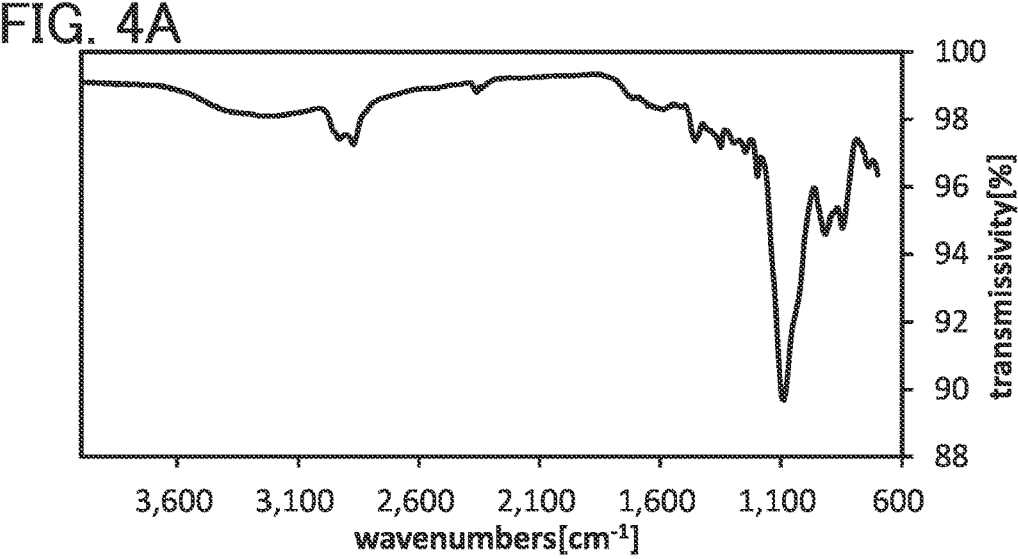
FIGS. 4A to 4C show results of an FT-IR analysis.
Figure 4B:
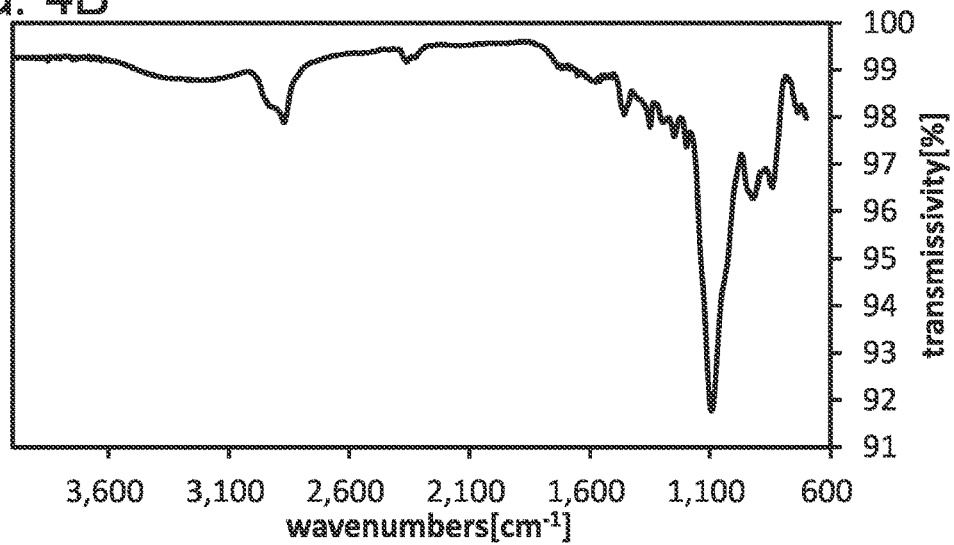
Figure 4C:
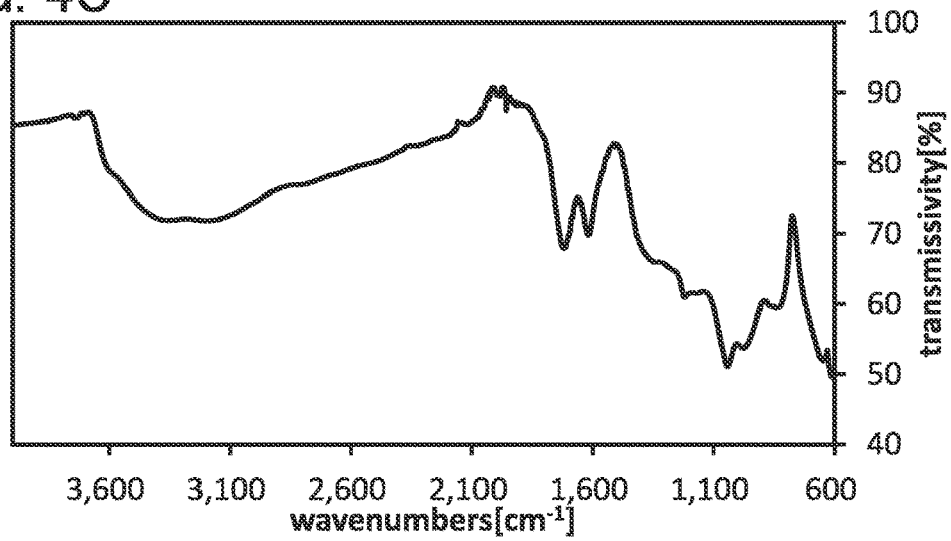

FIGS. 4A to 4C show the measurement results. FIG. 4A shows an FT-IR spectrum of the sample 1, FIG. 4B shows an FT-IR spectrum of the sample 2, and FIG. 4C shows an FT-IR spectrum of the comparative sample 1.

In the spectrum of the unmodified graphene oxide (comparative sample 1) shown in FIG. 4C, a peak that is probably assigned to C=O stretching vibration (around 1720 cm$^{-1}$) and a peak that is probably assigned to C=C stretching vibration (around 1620 cm$^{-1}$) are observed. That is, the FT-IR spectrum of the unmodified graphene oxide is observed.

Meanwhile, in each of the chemically modified graphene compounds (sample 1 and sample 2), a peak that is probably assigned to C—H stretching vibration (around 2900 cm$^{-1}$) and a peak that is probably assigned to C—O stretching vibration and C—O—C antisymmetric stretching vibration (around 1100 cm$^{-1}$) are observed as shown in FIGS. 4A and 4B. Unlike in the spectrum shown in FIG. 4C, a peak that is probably assigned to a group having an ether bond is observed in each of FIGS. 4A and 4B.

Accordingly, the results confirm that the sample 1 and the sample 2 were each chemically modified with the group having an ether bond. In this manner, it is confirmed that the chemically modified graphene compound of one embodiment of the present invention was formed.

EXPLANATION OF REFERENCE

100: positive electrode current collector, 101: positive electrode active material layer, 102: negative electrode current collector, 103: negative electrode active material layer, 104: solid electrolyte layer, 110: lithium-ion storage battery, 207: exterior body, 1700: curved surface, 1701: plane, 1702: curve, 1703: radius of curvature, 1704: center of curvature, 1800: center, 1801: film, 1802: radius, 1803: film, 1804: radius, and 1805: battery material.

This application is based on Japanese Patent Application serial no. 2016-040093 filed with Japan Patent Office on Mar. 2, 2016, the entire contents of which are hereby incorporated by reference.

The invention claimed is:

1. A method for forming a graphene compound, comprising the steps of:
   stirring graphene oxide and a base under a nitrogen stream to form a first mixture;
   cooling the first mixture after the stirring step; and
   adding a silylating agent to the first mixture after the cooling, to form a second mixture,
   wherein the silylating agent further comprises a chain group comprising two or more ether bonds,
   wherein the chain group has a structure terminated with an alkoxyalkyl group, and
   wherein the base is any one of butylamine, pentylamine, hexylamine, diethylamine, dipropylamine, dibutylamine, triethylamine, tripropylamine and pyridine.

2. The method for forming a graphene compound according to claim 1, wherein the chain group comprises 2 to 20 ether bonds.

3. The method for forming a graphene compound according to claim 1, wherein the chain group comprises 4 to 20 ether bonds.

4. The method for forming a graphene compound according to claim 1, wherein a length in the longitudinal direction of the graphene oxide is greater than or equal to 50 nm and less than or equal to 100 μm.

5. The method for forming a graphene compound according to claim 1, wherein the chain group is a straight chain.

6. The method for forming a graphene compound according to claim 1, wherein the silylating agent is 2-[methoxy (polyethyleneoxy)6-9propyl]trichlorosilane.

* * * * *